US 011558911 B2

(12) United States Patent
Kim et al.

(10) Patent No.: US 11,558,911 B2
(45) Date of Patent: Jan. 17, 2023

(54) COMMUNICATION METHOD AND DEVICE FOR EDGE COMPUTING SYSTEM

(71) Applicant: Samsung Electronics Co., Ltd., Suwon-si (KR)

(72) Inventors: Hyesung Kim, Suwon-si (KR); Sunghoon Kim, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/211,644

(22) Filed: Mar. 24, 2021

(65) Prior Publication Data

US 2021/0307089 A1 Sep. 30, 2021

(30) Foreign Application Priority Data

Mar. 25, 2020 (KR) .................. 10-2020-0036514

(51) Int. Cl.
*H04W 4/50* (2018.01)
*H04W 76/12* (2018.01)
*H04W 76/11* (2018.01)
*H04W 80/10* (2009.01)

(52) U.S. Cl.
CPC .............. *H04W 76/11* (2018.02); *H04W 4/50* (2018.02); *H04W 76/12* (2018.02); *H04W 80/10* (2013.01)

(58) Field of Classification Search
CPC ....... H04W 76/11; H04W 4/50; H04W 76/12; H04W 80/10; H04L 67/2885; H04L 41/0806; H04L 61/3075; H04L 61/6068; H04L 67/16; H04L 67/289
See application file for complete search history.

(56) References Cited

U.S. PATENT DOCUMENTS

2005/0273668 A1  12/2005  Manning
2015/0365819 A1  12/2015  Zhu et al.

FOREIGN PATENT DOCUMENTS

WO  2017/186260 A1  11/2017
WO  2019/104280 A1  5/2019
WO  WO-2022099484 A1 * 5/2022

OTHER PUBLICATIONS

3GPP TS 23.558 V0.1.2 2020 40 pages (Year: 2020).*
3GPP TS23.588V0. 1.2 2020 40 Pages (Year: 2020).*
(Continued)

*Primary Examiner* — Joseph E Dean, Jr.

(57) ABSTRACT

According to an embodiment, a method of a user equipment (UE) in a communication system supporting an edge computing service using an edge data network including a first server providing, to the UE, first configuration information for application data traffic and a second server exchanging, with the UE, the application data traffic comprises transmitting a service provisioning request to a third server providing second configuration information for a connection with the first server and receiving, from the third server, a service provisioning response including network identification information related to a list of the first server or the second server in response to transmitting the service provisioning request.

20 Claims, 8 Drawing Sheets

(56) References Cited

OTHER PUBLICATIONS

"3rd Generation Partnership Project; Technical Specification Group Services and System Aspects; Architecture for enabling Edge Applications; (Release 17)", 3GPP TS 23.558 VO.1.2 (Jan. 2020), 40 pages.
International Search Report dated Jun. 29, 2021 in connection with International Patent Application No. PCT/KR2021/003668, 3 pages.
Written Opinion of the International Searching Authority dated Jun. 29, 2021 in connection with International Patent Application No. PCT/KR2021/003668, 4 pages.

* cited by examiner

COMMUNICATION METHOD AND DEVICE FOR EDGE COMPUTING SYSTEM

CROSS-REFERENCE TO RELATED APPLICATION

This application is based on and claims priority under 35 U.S.C. § 119 to Korean Patent Application No. 10-2020-0036514 filed on Mar. 25, 2020 in the Korean Intellectual Property Office, the disclosure of which is herein incorporated by reference in its entirety.

BACKGROUND

1. Field

The disclosure relates to edge computing technology, and more specifically, to communication methods and devices in an edge computing system including an edge data network (EDN).

2. Description of Related Art

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network (RAN) as a Big data processing technique may be said to be an example of the convergence of the 5G and IoT technologies.

SUMMARY

According to the disclosure, there are provided efficient communication methods and devices in an edge computing system.

According to the disclosure, there are provided communication methods and devices for selecting/determining an EDN in a computing system.

According to the disclosure, there are provided communication methods and devices for selecting/determining an edge enabler server (EES) depending on the data transmission distance in a hierarchical edge computing system.

According to an embodiment, a method of a user equipment (UE) in a communication system supporting an edge computing service using an edge data network including a first server providing, to the UE, first configuration information for application data traffic and a second server exchanging, with the UE, the application data traffic comprises transmitting a service provisioning request to a third server providing second configuration information for a connection with the first server and receiving, from the third server, a service provisioning response including network identification information related to a list of the first server or the second server in response to transmitting the service provisioning request.

According to an embodiment, a UE in a communication system supporting an edge computing service using an edge data network including a first server providing, to the UE, first configuration information for application data traffic and a second server exchanging, with the UE, the application data traffic comprises a transceiver and a processor configured to transmit, via the transceiver, a service provisioning request to a third server providing second configuration information for a connection with the first server and receive, from the third server via the transceiver, a service provisioning response including network identification information related to the first server or the second server in response to transmitting the service provisioning request.

According to an embodiment, a method of a third server providing, to a user equipment (UE), second configuration information for a connection with a first server in a communication system supporting an edge computing service using an edge data network including the first server providing, to the UE, first configuration information application data traffic and a second server exchanging, with the UE, the application data traffic comprises receiving a service provisioning request from the UE and transmitting, to the UE, a service provisioning response including network identification information related to a list of the first server or the second server in response to receiving the service provisioning request.

According to an embodiment, a third server providing, to a user equipment (UE), second configuration information for a connection with a first server in a communication system supporting an edge computing service using an edge data network including the first server providing first configuration information for application data traffic and a second server exchanging, with the UE, the application data traffic comprises a communication interface and a processor configured to receive a service provisioning request from the UE via the communication interface and transmit, to the UE via the communication interface, a service provisioning response including network identification information related to a list of the first server or the second server in response to receiving the service provisioning request.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
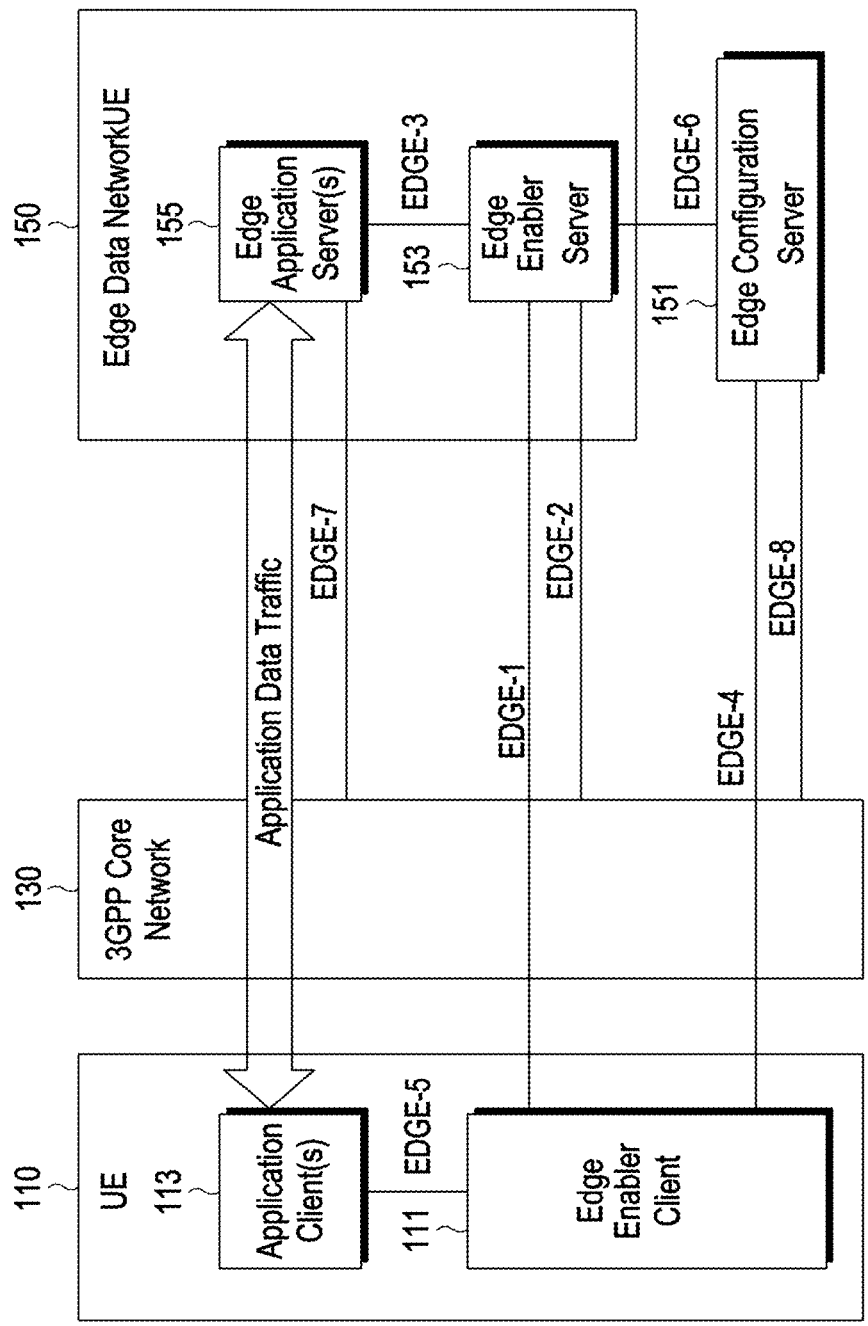
FIG. 1 is a view illustrating a configuration of an edge computing system according to an embodiment of the disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operational principle of the disclosure is described below with reference to the accompanying drawings. The terms described below are ones defined considering functions in the disclosure. Since the terms may be varied according to the user's or operator's intent or custom, their definitions should be determined according to the contents throughout the disclosure.

The terms referring to network entities and objects of an edge computing system as used herein, the terms referring to messages, and the term referring to identification information are provided as an example for ease of description. Thus, the disclosure is not limited by the terms, and such terms may be replaced with other terms denoting objects with equivalent technical concept.

Although terms and names as defined in the 5G system standard are used herein for ease of description, embodiments of the disclosure are not limited thereto or thereby, and the same may apply likewise to systems conforming to other standards.

Hereinafter, embodiments of the disclosure are described in detail with reference to the accompanying drawings.

When making the gist of the disclosure unnecessarily unclear, the detailed description of known functions or configurations is skipped.

The electronic device according to various embodiments may be one of various types of electronic devices. The electronic devices may include, for example, a portable communication device (e.g., a smart phone), a portable multimedia device, a portable medical device, a camera, a wearable device, or a home appliance. According to an embodiment of the disclosure, the electronic device is not limited to the above-listed embodiments. It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It may be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another and does not limit the components in other aspect (e.g., importance or order). It may be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. According to an embodiment, a module may be implemented in the form of an application-specific integrated circuit (ASIC).

Various embodiments as set forth herein may be implemented as software (e.g., a program) including one or more instructions that are stored in a storage medium (e.g., internal memory or external memory) that is readable by the electronic device. For example, a processor of the electronic device may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the electronic device may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM) or digital video disc (DVD)-ROM), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The 5G network technology shown in the drawings and described in the description of the disclosure refers to the standards (e.g., TS 23.558) defined by the international telecommunication union (ITU) or 3GPP, and each of the components included in the network environment of FIG. 1 to be described below may mean a physical entity unit or a software or module unit capable of performing an individual function.

According to an embodiment of the disclosure, electronic device may refer to various devices used by the user. For example, electronic device may mean a terminal, user equipment (UE), mobile station, subscriber station, remote terminal, wireless terminal, or user device. In the embodiments described below, user equipment (UE) is used as an example of the electronic device for convenience purposes.

According to an embodiment of the disclosure, an access network (AN) may provide a channel for wireless communication with the electronic device. An AN may be a radio access network (RAN), a base station, an eNB, an eNodeB, a 5G node, a transmission/reception point (TRP), or a 5th generation NodeB (SGNB). According to an embodiment of the disclosure, a core network (CN) may manage at least one of subscriber information, mobility, access authorization, data packet traffic, or billing policy for the UE. The CN may include at least one of a user plane function (UPF) node, an access & mobility management function (AMF) node, a session management function (SMF) node, a unified data management (UDM) node, or a policy control function (PCF) node. For the functions and operations of the nodes (or entities) included in the CN, the standards (e.g., TS 23.501) defined by the 3GPP may be referred to.

Edge computing is technology that has been provided to be able to host the service of the operator and/or a third party close to an access point, such as a base station, and reduce the end-to-end latency and load of the network to provide an efficient service. Such edge computing technology may shorten the data processing time by processing data in real time in a short distance from the site where the data is generated without transmitting the data generated from various terminals to a central cloud network (hereinafter referred to as a "central cloud"). For example, edge computing technology may be applied to technical fields, e.g., autonomous vehicles, that require rapid processing in various situations that may occur while driving. Edge computing is a concept of a network architecture that enables a cloud computing function and a service environment, and a network for edge computing may be deployed near the UE. Edge computing offers advantages, such as reduced latency, increased bandwidth, reduced backhaul traffic, and prospects for new services over cloud environments. The 5G- or 6G- or its subsequent-generation core network CN proposed by the 3rd generation partnership project (3GPP) may expose network information and functions to edge computing applications (hereinafter, edge applications).

The disclosure relates to technology for mobile edge computing in which the UE establishes a data connection to an EDN located close to the UE to make use of a broadband service and accesses the edge application server (EAS) driven on the edge computing platform or the edge hosting environment operated by the EES of the EDN to thereby use data services.

FIG. 1 is a view illustrating a configuration of a communication system supporting an edge computing network (hereinafter, an "edge computing system") according to an embodiment of the disclosure.

Referring to FIG. 1, an EDN 150 includes an EAS 155 and an EES 153. In FIG. 1, an edge configuration server (ECS) 151 provides configuration information related to the EDN 150. The EAS 155, the EES 153, and the ECS 151 interact with the core network 130 to provide edge computing services to the UE 110. The core network 130 may use, e.g., a 5G or 6G or its subsequent next-generation core network. The UE 110 may include an application client 113 and an edge enabler client (EEC) 111. Although not shown, the UE 110 may further include an edge configuration client (ECC).

The functions of each entity in FIG. 1 are described. The EES 153 provides supporting functions necessary for the EAS 155 and the EEC111. For example, the EES 153 may provide configuration information to the EEC111 to enable exchange (transmission and reception) of application data traffic between the EAS 155 and the application client 113 and provide information related to the EAS 155 to the EEC111. The EEC111 provides supporting functions necessary for the application client 113. For example, the EEC111 retrieves configuration information to enable the exchange of application data traffic with the EAS 155 and provides the configuration information to the application client 113, and may search for the EAS 155 available in the EDN.

In FIG. 1, the ECS 151 provides a supporting function necessary for the EEC111 to connect to the EES 153. For example, the ECS 151 may provide, e.g., service area information and network address information (e.g., uniform resource identifier (URI)) for connecting the EEC111 to the EES 153. The ECS 151 may be deployed in the communication service provider's mobile network operator (MNO) domain or the service provider's 3rd party domain. The application client 113 is installed in the UE 110 to perform functions as a client and supports transmission and reception of application data traffic between the UE 110 and the EAS 155. The EAS 155 performs functions as a server for transmitting and receiving data traffic in the EDN. Although FIG. 1 illustrates one EAS 155, one EES 153, and one ECS 151 for convenience, there may be a plurality of EESs/EASs/ECSs, respectively.

In FIG. 1, EDGE-1 to EGGE-8 mean network interfaces (i.e., reference points) between entities and are described in Table 1 below. However, EDGE-1 to EGGE-8 are not limited to the descriptions in Table 1.

TABLE 1

| Reference Points | Description |
| --- | --- |
| EDGE-1 | EDGE-1 reference point enables interactions between the Edge Enabler Server and the Edge Enabler Client. It supports: a) registration and de-registration of the Edge Enabler Client to the Edge Enabler Server; b) retrieval and provisioning of Edge Application Server configuration information; and c) discovery of Edge Application Servers available in the Edge Data Network |
| EDGE-2 | EDGE-2 reference point enables interactions between the Edge Enabler Server and the 3GPP Core Network. It supports access to 3GPP Core Network functions and APIs for retrieval of network capability information. |
| EDGE-3 | EDGE-3 reference point enables interactions between the Edge Enabler Server and the Edge Application Servers. It supports: a) registration of Edge Application Servers with availability information (e.g., time constraints, location constraints); b) de-registration of Edge Application Servers from the Edge Enabler Server; and c) providing access to network capability information (e.g., location information). |
| EDGE-4 | EDGE-4 reference point enables interactions between the Edge Configuration Server and the Edge Enabler Client. It supports provisioning of Edge configuration information to the Edge Enabler Client. |
| EDGE-5 | EDGE-5 reference point enables interactions between Application Client(s) and the Edge Enabler Client. |
| EDGE-6 | EDGE-6 reference point enables interactions between the Edge Configuration Server and the Edge Enabler Server. It supports registration of Edge Enabler Server information to the Edge Enabler Network Configuration Server. |
| EDGE-7 | EDGE-7 reference point enables interactions between the Edge Application Server and the 3GPP Core Network. It supports access to 3GPP Core Network functions and APIs for retrieval of network capability information |
| EDGE-8 | EDGE-8 reference point enables interactions between the Edge Configuration Server and the 3GPP Core Network. |

Figure 2:
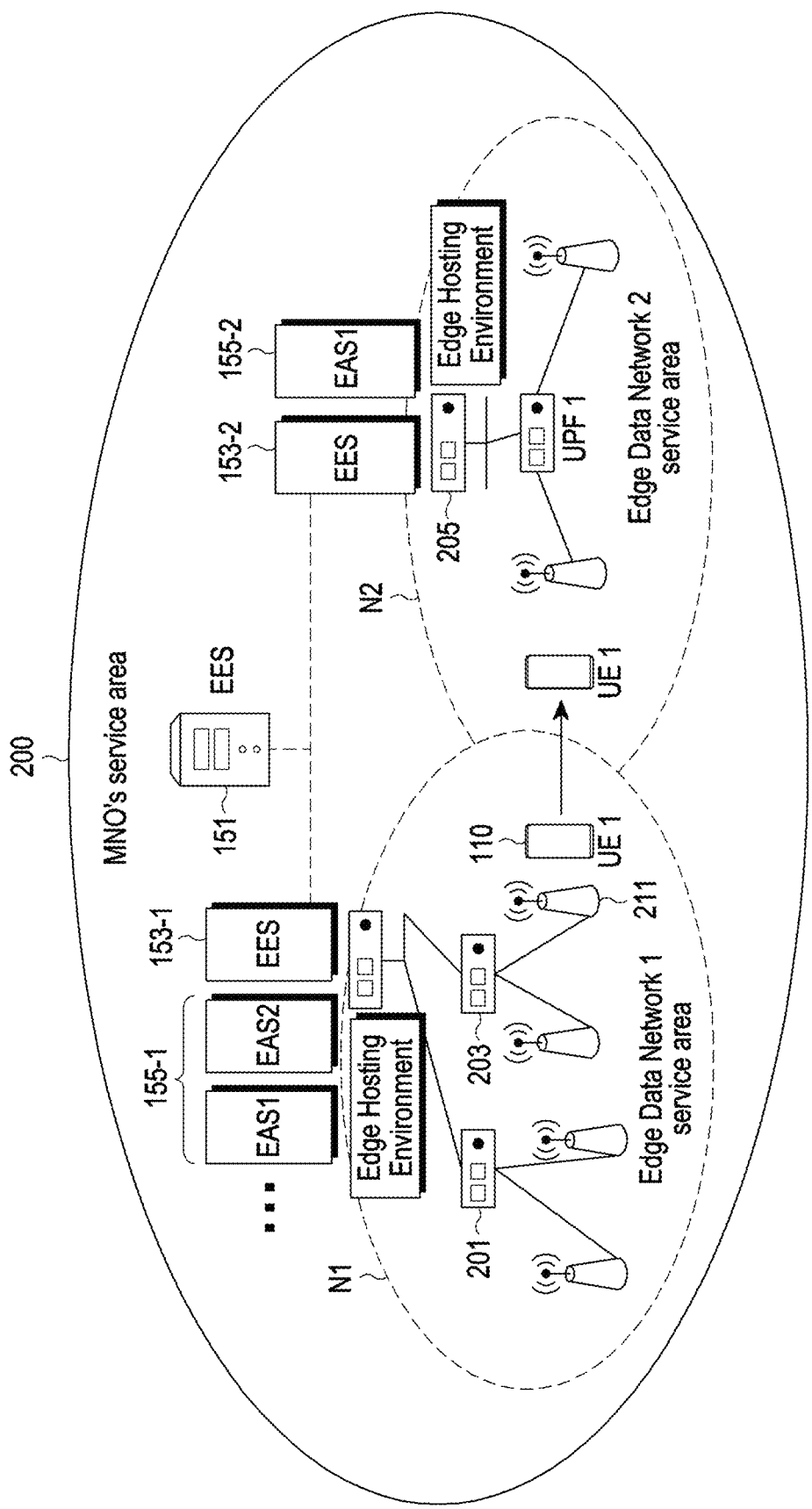
FIG. 2 is a view illustrating an example scenario of implementing an edge computing system according to an embodiment of the disclosure.

FIG. 2 illustrates an example scenario of implementing an edge computing system according to an embodiment of the disclosure. In FIG. 2, an MNO service area 200 indicates an example MNO domain of the communication service provider supporting an edge computing service.

The network and edge computing entities illustrated in FIG. 2 are described below. UPFs (e.g., UPF1, UPF2, . . . ) 201, 203, and 205 serve as a gateway through for transferring packets transmitted and received by the UE 110. To support an edge computing service, EESs 153-1 and 153-2 may be located near the UPFs 201, 203, and 205. The UPF may perform low-latency transmission by directly transferring data packets to edge data networks (EDNs) N1 and N2 without passing through the Internet, which is an external network. Further, the UPF may be connected to a data network connected to the Internet.

As illustrated in the configuration example of FIG. 1, the edge computing system includes edge enabler servers (EES)

153-1, 153-2, and 153, an ECS 151, and edge enabler clients (EEC) 151-1, 151-2, and 151. The EESS (EES) 153-1, 153-2, and 153 build an edge hosting environment (or edge computing platform) and have information about the EASs 155-1 and 155-2 running in the edge hosting environment.

In FIG. 2, the EESs 153-1, 153-2, and 153 communicate with the UE 110 through an access point 211, e.g., a base station, thereby connecting the application client 113 of the UE 110 with the EASs 155-1, 155-2, and 155 in the edge hosting environment. The UE 110 supporting the edge computing system may include an EEC111, and the communication with the EESs 153-1, 153-2, and 153 may be performed through interworking between the EEC111 and the EESs 153-1, 153-2, and 153. The layer where the interworking is performed may be referred to as an edge enabling layer. The UE 110 referred to in the disclosure may be not only a smartphone, but also an IoT device or a vehicle, as described above.

In FIG. 2, the ECS 151 has deployment information for the edge enabler servers (EES) 153-1, 153-2, and 153 and functions to transfer configuration information for using the edge computing service to the UE 110. The configuration information may include at least one piece of EDN connection information (e.g., data network name or single-network slice selection assistance information (S-NSSAI)) (S-NSSAI is an identifier for identifying the network slice in the 5G system), EDN service area information (e.g., cell list, list of tracking area (TA), public land mobile network (PLMN) ID), EES connection information (e.g., URI). The configuration information may also include information indicating which layer the EDN 150 is present on, which includes the EES 153 and providing the edge computing service if the edge computing network is hierarchically configured. The layer may be determined depending on the data transmission distance between the UE 110 and the EDN 150 and may be selected based on various criteria according to the type of the service to be used by the UE, subscriber information, and network operator's policy.

In relation to a hierarchical configuration of the edge computing network, as an example, the network operator may find the EDN 150 (e.g., the EES and the EAS) located in the shortest distance accessible by the UPF connected with the UE 110 based on the core network configuration information and provide information about the found EDN 150 to the UE 110 through the ECS 151. Further, there may be provided differentiated services depending on subscription levels, e.g., selecting the EDN 150 which is located in the shortest data transmission distance, relatively close, or relatively distant, depending on the service subscription levels. The relative distance may be set to various distances according to predetermined criteria. How to find the EDN 150 in the hierarchical configuration of the edge computing network may be implemented via various embodiments for finding/selecting the EES belonging to a related/preferred layer, as described below.

The EDN service areas N1 and N2 may be area in which the EES is available, as set by the EESs 153-1, 153-2, and 153. Based on this, when there are multiple EESs, the UE 110 may receive information about the EES accessible in a specific location from the ECS 151. Further, if the ECS 115 may obtain information about the edge application servers (EAS) 155-1, 155-2, and 155 running in the edge hosting environment of a specific EES, the UE 110 may obtain the corresponding EAS information through the EEC111.

The EAS 155 may be a third party application server running in the edge computing system and, as the EAS 155 runs on the infrastructure provided by the edge hosting environment and is able to provide an edge computing service in a location close to the UE 110, the EAS 155 may provide ultra-low latency services. Information about an upper layer of a service provided by the EAS 155 to the UE 110 may be referred to as an application context. For example, when the user uses a real-time game application, all information necessary to regenerate the screen the user is currently viewing in the game and the play stage may be included in the application context. In other words, for the UE 110 to connect to another EAS 155 to seamlessly use the existing service, the application context needs to be relocated in the EAS to be newly connected. To perform the application context relocation, the EAS 155 capable of providing a service to the application running on the application client 113 of the UE 110 needs to be in the available state. Availability of the EAS 155 in the EDN may be determined depending on whether the EAS 155 is running in the edge hosting environment and the state of the EAS 155.

The UE 110 may include an application client 113, an EEC111 for interworking for the edge computing service for data traffic transmission/reception between the application client 113 and the EAS 155 and a device configuration (mobile terminal/termination) including a processor and a transceiver for communication in the wireless communication system. The application of the UE 110 is an application provided by a third party and refers to a client application that are driven in the UE 110 for a specific application service. Several applications may be driven in the UE 110. At least one or more of these applications may use the edge computing service. The EEC111 in the UE 110 refers to a client that performs operations in the UE 110 required to use the edge computing service. The EEC111 may determine what applications may use the edge computing service and perform the operation of connecting a network interface to allow the data from the application client 113 to be transferred to the EAS 155 providing the edge computing service. The operation for establishing a data connection for using the edge computing service in the UE 110 may be performed in the 3GPP communication layer. The 3GPP communication layer refers to a layer that performs modem operations for using a mobile communication system. The 3GPP communication layer establishes a wireless connection for data communication, registers the UE 110 in the mobile communication system, establishes a connection for transmission of data to the mobile communication system, and transmits and receives data.

Figure 3:
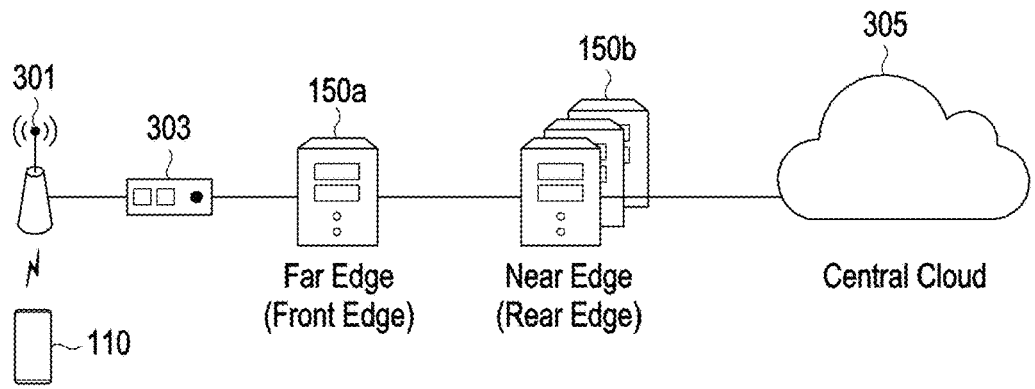
FIG. 3 is a view illustrating a method for classifying EDNs depending on transmission distances in a hierarchical edge computing system according to an embodiment of the disclosure.

FIG. 3 is a view for describing a method for classifying EDNs according to transmission distances in a hierarchical edge computing system according to an embodiment of the disclosure. EDNs may be hierarchically configured according to the transmission distances.

Referring to FIG. 3, the UE 110 may communicate with at least one of EDNs 150a, 150b, and 150 of an edge computing system through an access point 301, such as a base station, and a UPF 303. In this embodiment, the EDNs may be divided into a first EDN 150a which is located relatively close to the UE 110 and a second EDN 150b which is located relatively far from the UE 110, with respect to the transmission distance from the UE 110. In this case, with respect to the UE 110, the first EDN 150a may be referred to as a "Front Edge," and the second EDN 150b may be referred to as a "Rear Edge." Further, in the instant embodiment, the EDNs may be divided into a first EDN which is located relatively far from the central cloud 305 and a second EDN 150b which is located relatively close to the central cloud 305, with respect to the transmission distance from the central cloud 305. In this case, with respect to the central cloud 305, the first EDN 150a may be referred to as a "Far Edge" and the second EDN 150b may be referred to as a "Near Edge." In the embodiment of FIG. 3, for convenience, the EDNs are divided into two networks depending on distances, but the EDNs may be divided into three or more networks depending on more distances. Further, there may be one or more first EDN 150a and one or more second EDN 150b depending on, e.g., regional characteristics.

Figure 4:
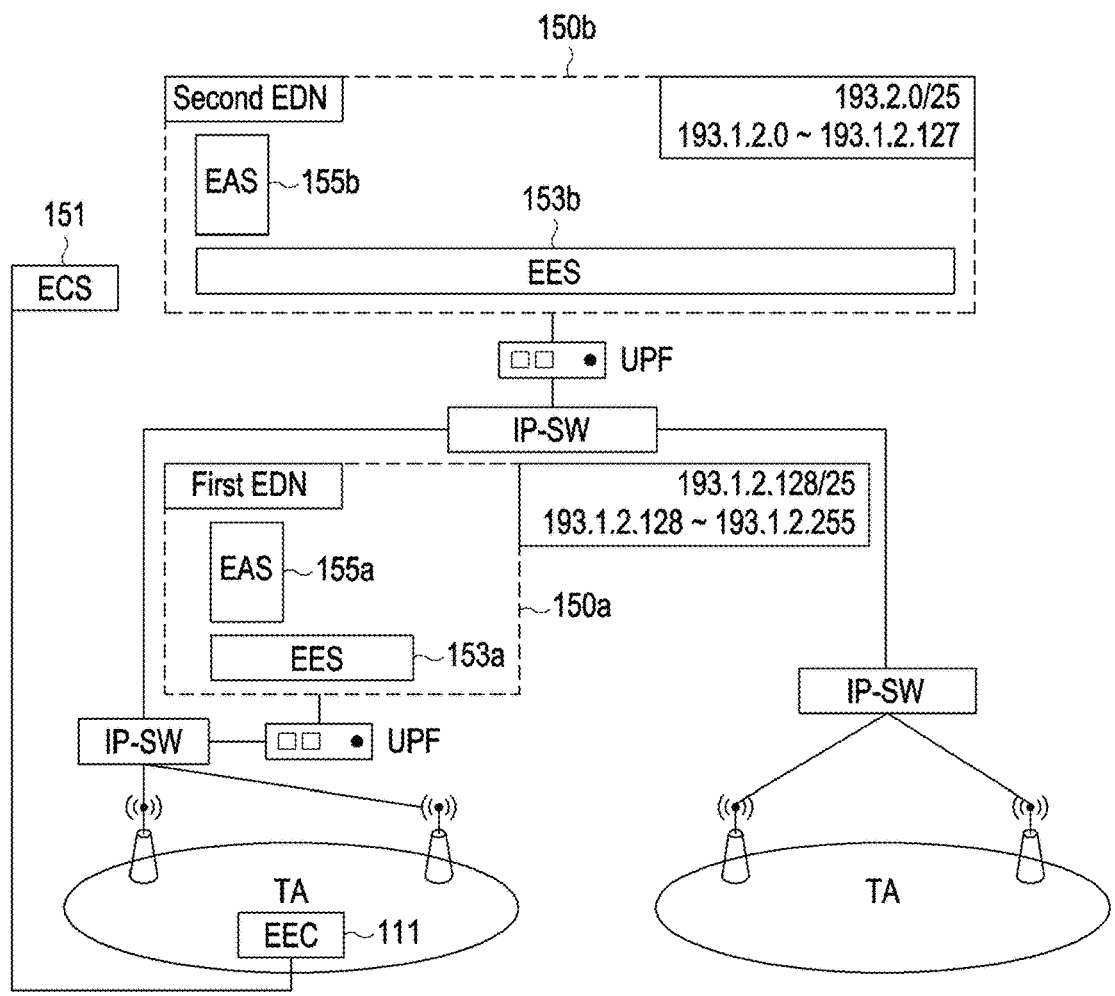
FIG. 4 is a view illustrating a method for classifying EDNs using subnet information in a hierarchical edge computing system according to an embodiment of the disclosure.

FIG. 4 is a view for describing a method for classifying edge data networks (EDNs) using subnet information in a hierarchical edge computing system according to an embodiment of the disclosure. In FIG. 4, the same method for classifying EDNs depending on transmission distances as described above in connection with FIG. 3 may apply to the first EDN 150a and the second EDN 150b of FIG. 4.

In FIG. 4, the first EDN 150a may include an EES 153a and an EAS 155a, and the second EDN 150b may include an EES 153b and an EAS 155b. The functions and operations of the EAS, EES, EEC, ECS, and EDN are identical to those described above in connection with FIGS. 1 to 3, and no further description thereof is given below. The description given above in connection with FIGS. 1 to 3 may apply to the components shown in FIG. 4.

The EEC111 included in the UE 110 of FIG. 4 provides supporting functions necessary for the application client 113. For example, the EEC111 retrieves configuration information to enable the exchange of application data traffic with the EAS 155a, 155b, or 155 and provides the configuration information to the application client 113, and may search for the EAS 155a, 155b, or 155 available in the EDN. The EEC111 may access at least one of the first EDN 150a and the second EDN 150b, or the EEC111 may simultaneously access the two EDNs. The first EDN 150a and the second EDN 150b may be connected to the 3GPP core network through different UPFs. The UE 110 has a current session established, and the subnet ID for the session of the UE 110 is determined depending on what UPF the established session has been connected. The network operator and the provider of the EESs 153a, 153b, and 153 may previously configure at least one (hereinafter, subnet information) of the subnet ID and subnet mask of the EES 153 in the EES 153 and register the subnet information in the ECS. In the embodiment of FIG. 4, the EES subnet ID of the EES 153a located in the first EDN 150a may be, e.g., 193.1.2.128/25, and the edge subnet mask may be, e.g., 255.255.255.128. The IP address of the EES 153a may have a value between 193.1.2.128 and 193.1.2.255. The edge subnet mask may be used to determine which edge subnet the corresponding IP address belongs to via a masking operation (bit-wise AND operation) on the IP address of a specific EES. In the second EDN 150b, the EES subnet ID and the edge subnet mask may also be described in the same manner.

As described above in connection with the embodiment of FIG. 3, two or more EDNs may also be hierarchically configured in the embodiment of FIG. 4. As a method for hierarchically configuring the edge computing system, it may be possible to use a separate EDN identifier in addition to the subnet information.

As in an embodiment according to the disclosure, EDNs may be divided and selected which are hierarchically configured in the edge computing system based on the identifier of the EDN or the subnet information of the EES. Various embodiments of selecting an EES (i.e., EDN) in a hierarchical edge computing system according to an embodiment of the disclosure are described below. A distinct subnet ID may be used for each EDN. The subnet ID may be a value set by the service provider configuring the network. In the example of FIG. 4, the subnet ID corresponding to the first EDN is 193.1.2.128/25, which may be used to identified whether the corresponding EDN is in the Far Edge or the Near Edge. Further, the IP address of the EAS or EES in the corresponding EDN is determined within an IP address range that may be set based on the subnet ID. For example, a value between 193.1.2.128 and 193.1.2.255 in FIG. 4 is set as the IP address of the EAS or EES belonging to the first EDN. Such subnet-related information may be changed by the network operator's policy or settings.

Figure 5:
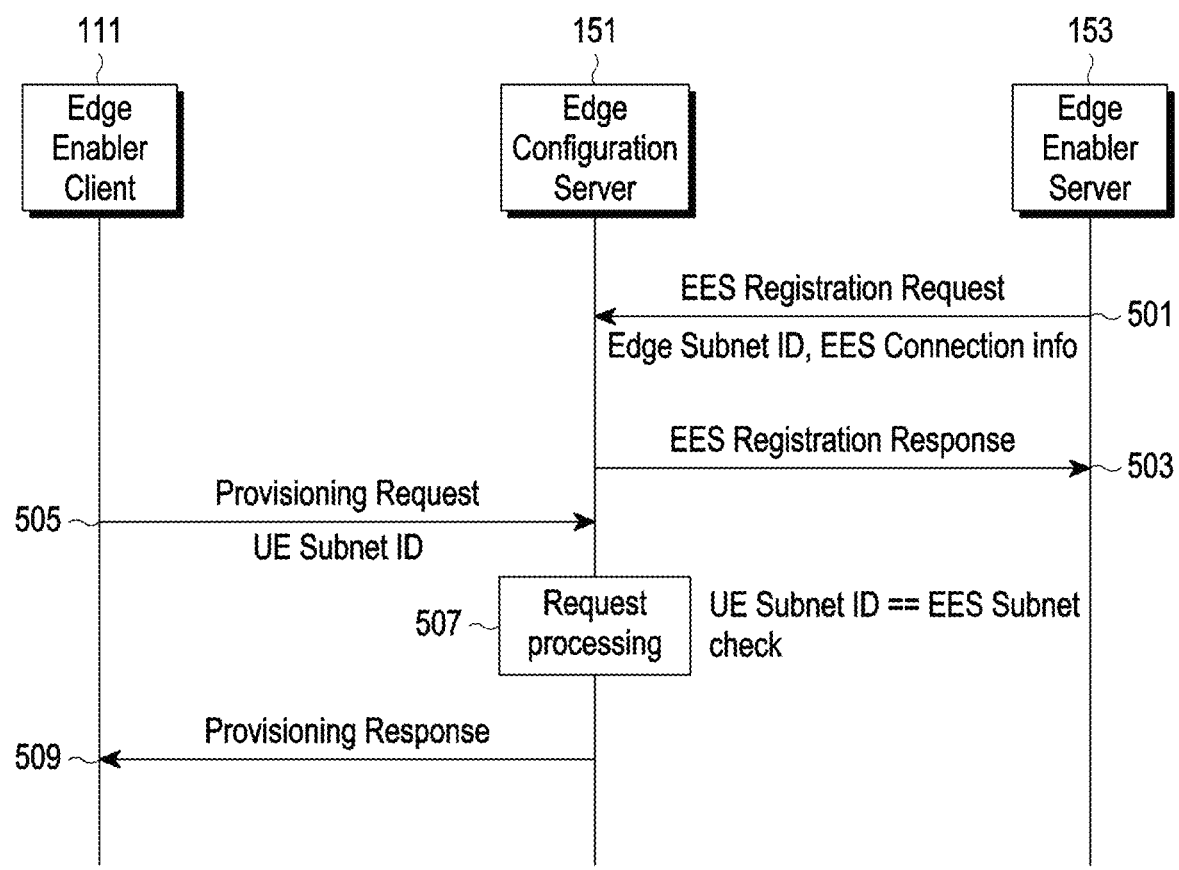
FIG. 5 is a view illustrating a method for selecting an EES for a UE by an ECS in a hierarchical edge computing system according to an embodiment of the disclosure.

FIG. 5 is a view illustrating a method for an ECS to select an EES for a UE in a hierarchical edge computing system according to an embodiment of the disclosure. The embodiment of FIG. 5 provides a scheme for selecting an EES based on the UE subnet ID.

In operation 501 of FIG. 5, the EES 153 transmits an EES registration request including the subnet information (edge subnet information) to which the EES 153 belongs to the ECS 151. The edge subnet information includes at least one of an edge subnet ID and an edge subnet mask to which the EES 153 belongs. The EES registration request may also include EES connection information (e.g., fully qualified domain name (FQDN) and IP address) or EES service area information. The edge subnet information/EES connection information/EES service area may be set in the EES 153 by the edge computing service provider or the network operator.

Table 2 below shows an example configuration of an EES registration request message according to the embodiment of FIG. 5.

TABLE 2

| Information element | Status | Description |
|---|---|---|
| EES ID | M | Unique identifier of the EES. |
| Registration type indication | M | Indication for new or updated registration |
| Security credentials | M | Security credentials resulting from a successful authorization for the edge computing service. |
| EES connection info | M | Connection info for the EES |
| >EES Endpoint | M | Endpoint information for establishing a connection to the EES (e.g., IP address) |
| >Edge subnet info | O | Information for Edge Data Network where EES belongs to. This IE includes subnet ID and Edge Subnet Mask |
| EAS Information | O | The information of EASs registered with the EES |

In operation 503 of FIG. 5, the ECS 151 transmits an EES registration response including the result of EES registration to the EES 153.

Thereafter, in operation 505 of FIG. 5, the EEC 111 in the UE transmits a provisioning request including the UE's subnet information (UE Subnet ID) to the ECS 151. The UE subnet ID may be configured as a network prefix part of the UE IP address. The UE subnet ID may take the form of an IP address. The UE IP address may be set by the SMF. The value of the subnet ID of the UE is determined depending on what subnet of data network the session is set with. The UE may receive the subnet information through the 3GPP core network. For example, the subnet ID of the data network and the UPF currently connected with the UE may be carried on the protocol configuration option (PCO) to the UE from the SMF. The subnet ID may be a value set by the network operator, and the information may be a value set by the network operator in the SMF that manages the IP of the UE (the subnet ID corresponding to the UPF and the data network may be determined, and the corresponding information may be pre-configured in the SMF). The UE's subnet ID may be included and transmitted in a provisioning request as follows.

Table 3 below shows an example configuration of a provisioning request message according to the embodiment of FIG. 5.

TABLE 3

| Information element | Status | Description |
| --- | --- | --- |
| EEC ID | M | Unique identifier of the EEC. |
| Security credentials | M | Security credentials resulting from a successful authorization for the edge computing service. |
| Application Client Profile(s) | M | Information about services the EEC wants to connect to, as described in Table 8.2.2-1. |
| UE info | O | Information for the UE |
| >UE Identifier | O | The identifier of the UE (i.e., GPSI or identity token) |
| >UE connection info | O | The connection info for the UE e.g., UE subnet ID |
| Connectivity Filter | O | List of connectivity information for the UE, e.g., PLMN ID, SSID. |

In operation 507 of FIG. 5, the ECS 151 compares the UE subnet ID received from the UE with the edge subnet ID of the EES 153 that is already registered, thereby selecting an EES having the identical subnet ID.

For the comparison, an operation for identifying the edge subnet ID of the EES may be performed by applying the UE subnet mask or the edge subnet mask to the EES endpoint IP address.

In operation 509 of FIG. 5, the ECS 151 transfers a provisioning response including the EES information identified to identify the EES located within the subnet to which the UE is connected through such an operation as subnet masking in operation 507 to the EEC 111 of the UE.

The EES information may include at least one of an EES IP address, EES service area information, data network name (DNN), and network slice information required for establishing a session with the EES. The EES IP address is the endpoint address of the EES from the EEC's standpoint. The EES service area is an area that may be set by the edge computing service provider and the network operator, and the EES service area may be set to provide edge computing services only within a specific area. The DNN and network slice information is information necessary for the UE to perform a session establishment request with the EES through the 3GPP network.

Figure 6:
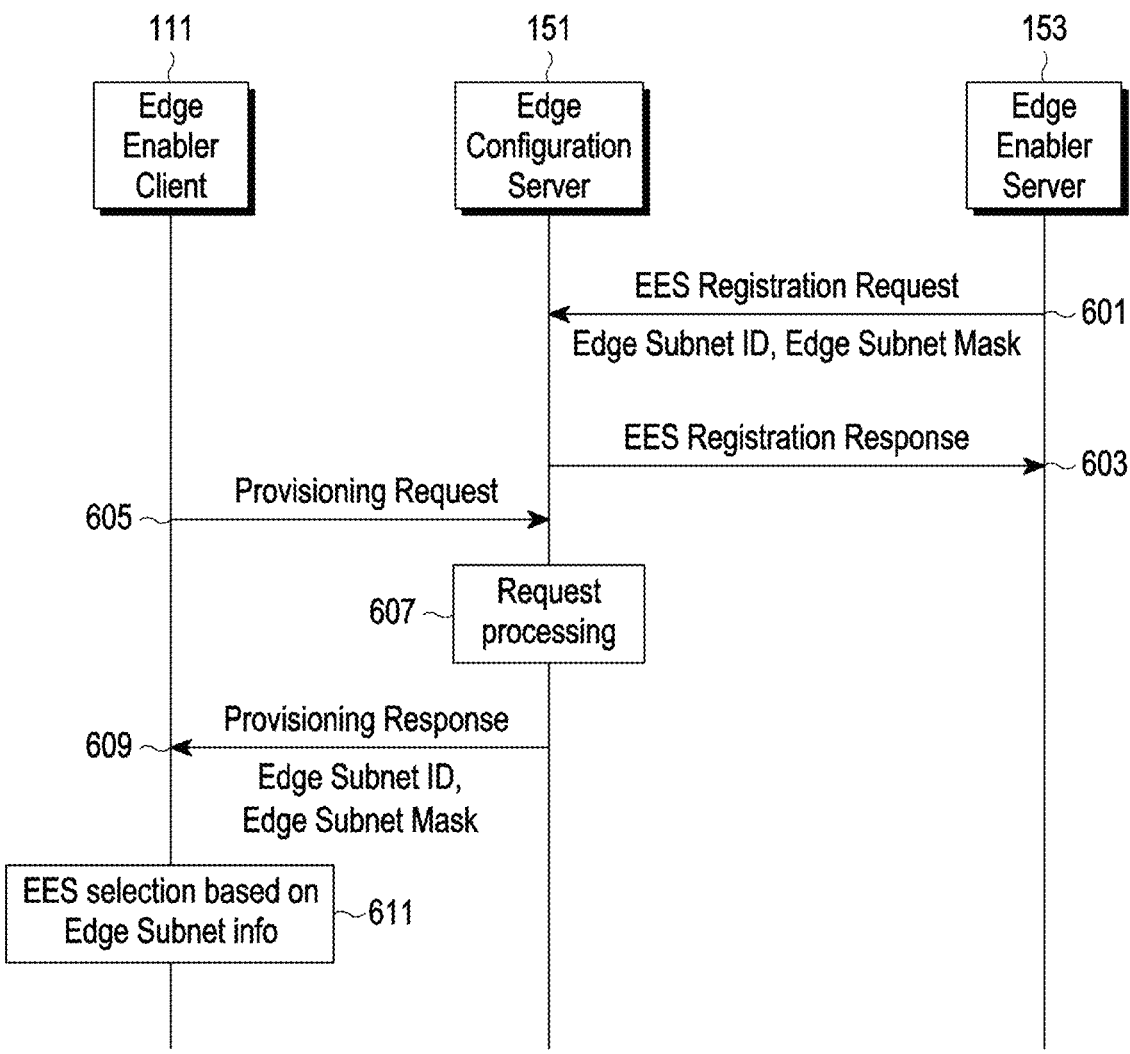
FIG. 6 is a view illustrating a method for selecting, by a UE, an EES to be accessed from an EES list provided by an ECS in a hierarchical edge computing system according to an embodiment of the disclosure.

FIG. 6 is a view illustrating a method for selecting, by a UE, an EES to be accessed from an EES list provided by an ECS in a hierarchical edge computing system according to an embodiment of the disclosure. To that end, an EES list and edge subnet information are provided to the UE.

In operation 601 of FIG. 6, the EES 153 transmits an EES registration request including the subnet information (edge subnet information) to which the EES 153 belongs to the ECS. The edge subnet information includes at least one of an edge subnet ID and an edge subnet mask to which the EES belongs. The EES registration request may also include EES connection information (e.g., FQDN and IP address) or EES service area information. The edge subnet information/EES connection information (e.g., EES endpoint address, DNN, or network slice information)/EES service area may be set in the EES 153 by the edge computing service provider or the network operator.

In operation 603 of FIG. 6, the ECS 151 transmits an EES registration response including the result of EES registration to the EES 153.

Thereafter, in operation 605 of FIG. 6, the EEC 111 in the UE transmits a provisioning request including the UE's subnet information (UE subnet ID) to the ECS 151. The UE subnet ID may be configured as a network prefix part of the UE IP address. The UE subnet ID may take the form of an IP address. The UE IP address may be set by the SMF. The value of the subnet ID of the UE is determined depending on what subnet of data network the session is set with. The UE may receive the subnet information through the 3GPP core network. For example, the subnet ID of the data network and the UPF currently connected with the UE may be carried on the protocol configuration option to the UE from the SMF. The UE may store the subnet information and may not include the subnet information in the provisioning request in operation 605. The subnet ID may be a value set by the network operator, and the information may be a value set by the network operator in the SMF that manages the IP of the UE (the subnet ID corresponding to the UPF and the data network may be determined, and the corresponding information may be pre-configured in the SMF).

In operation 607 of FIG. 6, the ECS 151 determines an EES list to be provided to the UE. For example, the ECS 151 may provide an EES list including all or some EESs registered in the ECS or may configure an EES list with EESs selected by applying a specific condition. As another example, the ECS 151 may select EESs that may be accessed by the UE using the location information for the UE. When the UE subnet information is provided in operation 605, the EES list may be configured by selecting the EES having subnet information matching the UE subnet information.

In operation 609 of FIG. 6, the ECS 151 transmits a provisioning response including the EES list determined in operation 607 and EES information for identifying the EES located in the UE-connected subnet in the list (hereinafter, EES list information) to the EEC 111 of the UE. The EES list information may include at least one of the edge subnet ID, edge subnet mask, EES connection information (EES endpoint address, DNN, network slice information, etc.), and EES service area which are required for session establishment with the EES. The EES endpoint address, DNN, network slice information, and EES service area are identical to those described above in connection with the embodiment of FIG. 5.

Table 4 below shows an example configuration of a provisioning response message according to the embodiment of FIG. 6.

TABLE 4

| Information element | Status | Description |
| --- | --- | --- |
| EDN connection info | M | DNN (or APN) |
| Edge Subnet info | O | Edge subnet ID and Edge Subnet Mask |
| EES Endpoint | M | The endpoint address (e.g., URI, IP address) of the EES |

TABLE 4-continued

| Information element | Status | Description |
| --- | --- | --- |
| EDN Service Area (NOTE) | O | Cell list, List of TA, PLMN IDs |
| ECSP info | O | Information for Edge Computing Service Provider |

(NOTE):
The EDN service area IE is included only if the EDN is a LADN.

In operation 611 of FIG. 6, the EEC 111 of the UE receiving the provisioning response applies the edge subnet mask provided by the ECS 151 to the UE IP address to identify the UE subnet ID. The UE selects the EES 153 having the edge subnet ID matching the UE subnet ID from the list provided by the ECS 151 and attempts to connect with the EES 153.

In the embodiments of FIGS. 5 and 6, a method for the UE to obtain UE subnet information is as follows. The SMF that manages the session of the UE may transmit the subnet ID and subnet mask information to which the UE is currently connected or connectable to the UE through the protocol configuration option. This is a method for providing via non-access stratum signaling through a 3GPP network.

In the above-described embodiments of FIGS. 5 and 6, instead of using the subnet of the UE and the subnet information for the EES, the data network access identifier (DNAI) information for each EES may be used to perform the following. For example, the DNAI information mapped to the EES accessible via the UPF to which the UE is currently connected may be provided through the SMF, and the DNAI information mapped to the EES may be included, instead of the subnet ID, when the provisioning request is sent from the UE to the ECS. Detailed examples are described below.

Figure 7:
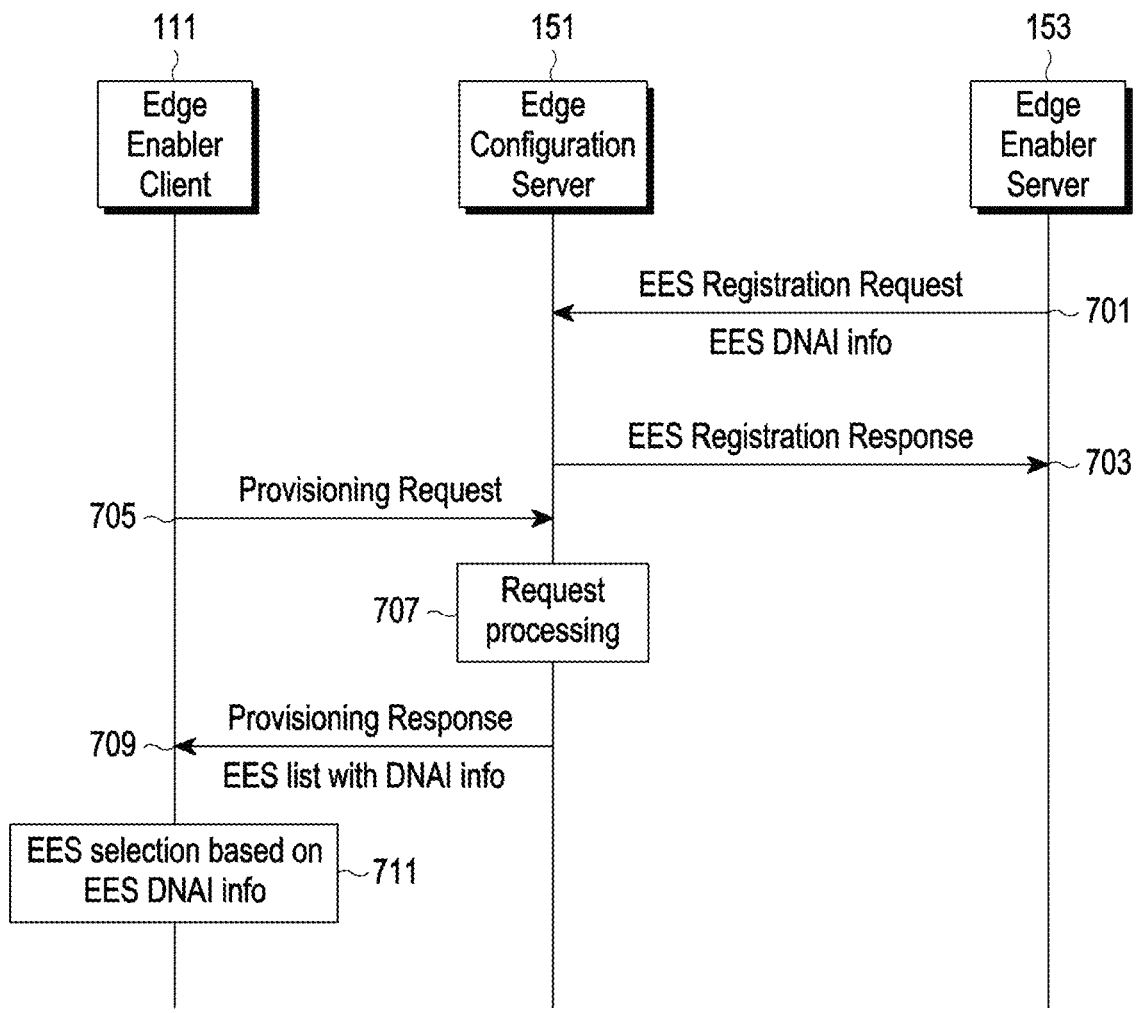
FIG. 7 is a view illustrating a method for selecting an EES based on DNAI in a hierarchical edge computing system according to an embodiment of the disclosure.

FIG. 7 is a view illustrating a DNAI-based EES selection method in a hierarchical edge computing system according to an embodiment of the disclosure. To that end, the EES list and edge subnet information are transmitted to the UE.

In operation 701 of FIG. 7, the EES 153 transmits an EES registration request including the connection information (e.g., EES DNAI information) with UPF of the EES 153 to the ECS 151. The EES registration request may also include EES connection information (e.g., FQDN and IP address) or EES service area information. At least one of the EES DNAI information/EES connection information (e.g., EES endpoint address, DNN, or network slice information)/EES service area may be set in the EES by the edge computing service provider or the network operator. The EES endpoint address, DNN, network slice information, and EES service area are identical to those described above in connection with the embodiment of FIG. 5.

In operation 703 of FIG. 7, the ECS 151 stores the received EES DNAI information and transmits an EES registration response including the result of EES registration to the EES 153.

Thereafter, in operation 705 of FIG. 7, the UE transmits a provisioning request including UE DNAI information to the ECS 151. To that end, the UE may perform the following operation before transmitting the provisioning request. The EEC 111 in the UE receives DNAI information for the data network in which the session is established through the UE-connected UPF from the 3GPP core network. To that end, the SMF may perform the operation of carrying the DNAI of the data network to which the UE is currently connected, over the protocol configuration option to the UE. The UE may store the so-obtained DNAI information in the UE and may not include the DNAI information in the provisioning request of operation 705 of FIG. 7.

In operation 707 of FIG. 7, the ECS 151 determines an EES list to be provided to the UE. For example, the ECS 151 may provide an EES list including all or some EESs registered in the ECS or may configure an EES list with EESs selected by applying a specific condition. When the UE DNAI information is received in operation 705, the EES having the same DNAI information as the UE DNAI may be selected, or an EES list composed of EESs having a DNAI value related to a UPF close to the UPF corresponding to the UE DNAI may be configured. In the network configuration, the EES access priorities may be marked in the EES list in the order of being closer to the UPF corresponding to the UE DNAI. As another example, when the UE DNAI information is not received in operation 705, the ECS 151 may select EESs that may be accessed by the UE using the location information for the UE, application information within the UE, UE ID, or UE connectivity information.

In operation 709 of FIG. 7, the ECS 151 transmits a provisioning response including EES information (the EES list determined in operation 707) for identifying the EES located in the UE-connected subnet in the EES list (EES list information) to the UE. The EES list information may include at least one of the EES DNAI information, EES connection information (EES endpoint address, DNN, network slice information, etc.), and EES service area.

In operation 711 of FIG. 7, the UE receiving the provisioning response compares the DNAI received via the non-access-stratum (NAS) message from the 3GPP core network (SMF) and the EES DNAI information and EES connection information provided by the ECS 151, selects a matching EES, and attempts to connect to the EES 153.

As another embodiment, a method for performing operations without transmitting the UE DNAI information from the EEC 111 to the ECS 151 as in the embodiment of FIG. 7 is as follows. The ECS 151 may obtain the DNAI value (this DNAI value is identical to the DNAI that the UE receives via the 3GPP NAS signaling in the embodiment of FIG. 7) mapped to the UPF/data network connected with the UE using the network exposure service of the 3GPP core network. The ECS 151 may identify/compare the DNAI value obtained via the 3GPP core network with the DNAI obtained from the EES 153, select (determine) the EES 153 where the UE is to connect, and provide the selected (determined) EES connection information to the UE via the provisioning response.

Figure 8:
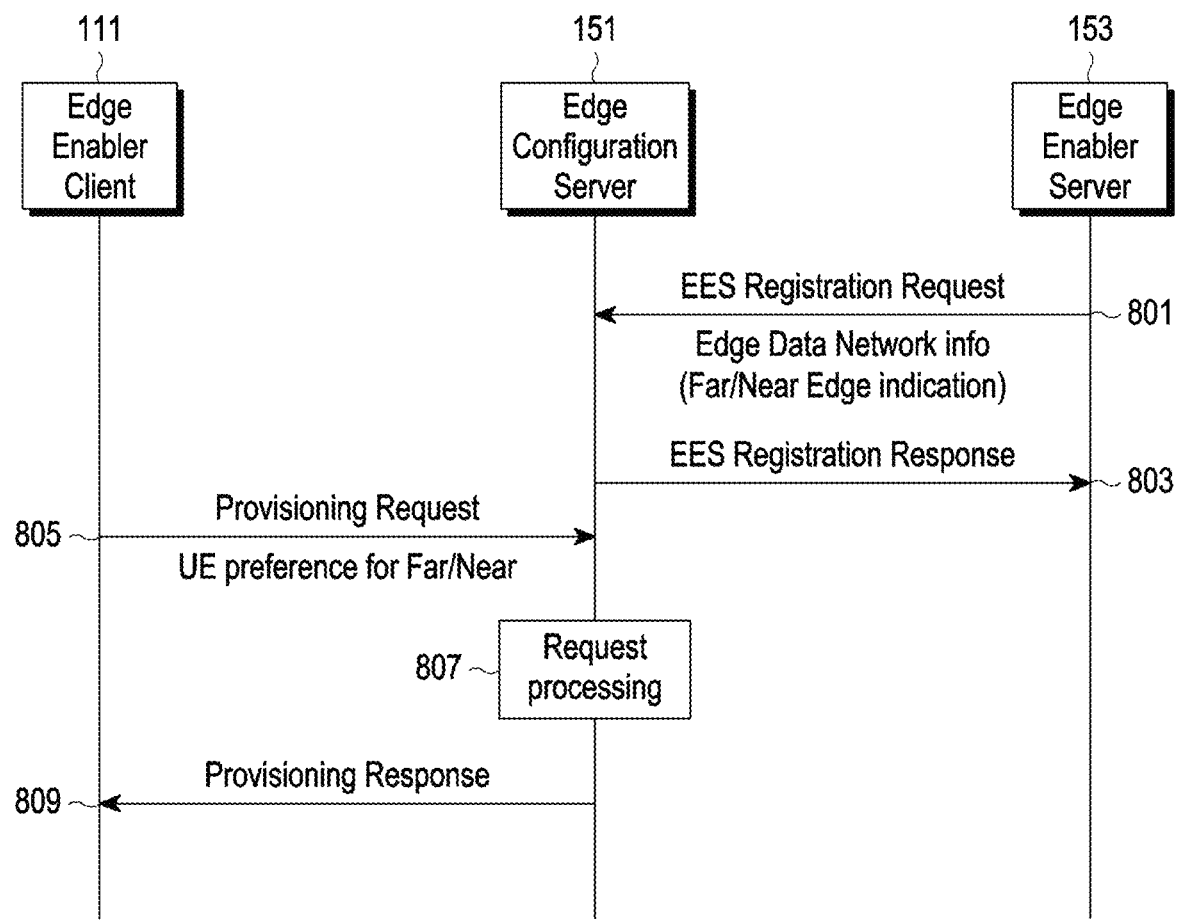
FIG. 8 is a view illustrating another method for selecting, by a UE, an EES to be accessed from an EES list provided by an ECS in a hierarchical edge computing system according to an embodiment of the disclosure.

FIG. 8 is a view illustrating another method for selecting, by a UE, an EES to be accessed from an EES list provided by an ECS in a hierarchical edge computing system according to an embodiment of the disclosure.

In operation 801 of FIG. 8, the EES 153 transfers an EES registration request including information (hereinafter, layer information) about the layer where the EES 153 is installed/configured via an EES registration procedure to the ECS 151. For example, the layer information may include information about the layer where the EES 153 is installed in the EES connection information or may use a separate indication to include the far/near edge indicator (or the indicator indicating the EDN of the corresponding layer among the first EDN to the nth EDN divided into n layers), as a front edge/rear edge differentiator or the far edge/near edge described above in connection with the embodiments of FIGS. 3 and 4 in the registration request and transfer the same to the ECS.

In operation 803 of FIG. 8, the ECS 151 stores the layer information received from the EES 153 and transmits an EES registration response including the result of the registration to the EES 153.

Thereafter, in operation 805 of FIG. 8, the UE provides the ECS 151 with a provisioning request including UE preference for far/near edge (which may also be denoted by other various terms, such as preferred EDN information, preferred layer information, or preferred EES information) or a security credential obtained via an authentication procedure. The UE preference information may be set in various ways according to the UE type (e.g., smartphone, vehicle, or drone) or subscriber information. For example, in the case of a high mobility-type UE, the UE preference information may be set with the near edge/rear edge described above in connection with the embodiment of FIG. 3. Alternatively, the UE preference information may be set according to the subscriber information for the user of the UE (e.g., for premium subscribers, selects far edge/front edge).

Table 5 below shows an example configuration of a provisioning request message according to the embodiment of FIG. 8.

TABLE 5

| Information element | Status | Description |
| --- | --- | --- |
| EEC ID | M | Unique identifier of the EEC. |
| Security credentials | M | Security credentials resulting from a successful authorization for the edge computing service. |
| Application Client Profile(s) | M | Information about services the EEC wants to connect to, as described in Table 8.2.2-1. |
| UE preference for Far/Near Edge | O | UE preference for Far/Near Edge Data Network |
| UE Identifier | O | The identifier of the UE (i.e., GPSI or identity token) |
| Connectivity Filter | O | List of connectivity information for the UE, e.g., PLMN ID, SSID. |

In operation 807 of FIG. 8, the ECS 151 receiving the provisioning request may identify, e.g., the UE preference information or security credential, compare the provisioning request with, e.g., the service level that may be provided to the UE, and determine what layer of EES 153 the UE is provided a service through. For example, for service differentiation, the ECS 151 may select an EES in the far edge (front edge) if the UE subscriber is a premium service user. Alternatively, the ECS 151 may select an EES that may be connected to the corresponding UPF in the shortest transmission distance using the UPF and data network information to which the UE is currently connected. Alternatively, an EES may be selected based on information in the application client profile provided from the UE (e.g., mobility required to be guaranteed, application type, key performance indicator (KPI) requirement, etc.).

In operation 809 of FIG. 8, the ECS 151 transmits a provisioning response including the selected/determined EES connection information to the UE.

In another embodiment, as in the embodiment of FIG. 8, the UE may receive the EES information (including the far edge indication) and EES list where the UE is currently connectible from the ECS 151 without transmitting UE preference information through the provisioning request of operation 805 and may then perform the EES selection operation.

Although techniques for configuring a hierarchical edge computing network depending on data transmission distances have been described above according to embodiments of the disclosure, other various criteria, such as network load, service provider's policy, and type of edge computing service, then the data transmission distance may be adopted for configuring a hierarchical edge computing network.

Although techniques for selecting an EES are described above according to embodiments, if the ECS is hierarchically present, a method for selecting an ECS may also be performed in the same or similar manner. Further, the EASs connected to the EES may also be hierarchically installed/configured, and the method of using, e.g., the subnet ID, subnet mask, DNAI, and UE preference according to the disclosure may also be applicable to EAS selection. The subnet ID and DNAI information according to the disclosure may correspond to geographic UE location information and, instead of the UE location information, may be used in edge computing system-related procedures.

Figure 9:
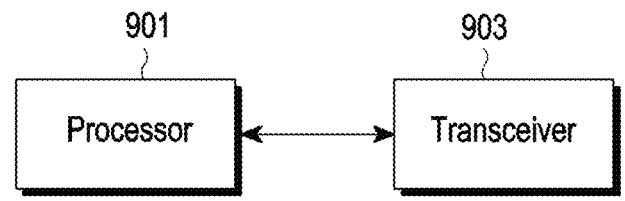
FIG. 9 is a view illustrating a configuration of a UE according to an embodiment of the disclosure.

FIG. 9 is a view illustrating a configuration of a UE according to an embodiment of the disclosure. The UE may include a processor 901 and a transceiver 903 that may perform wireless communication according to a predetermined communication scheme in a communication system supporting the above-described edge computing service. The processor 901 may control the operation of the transceiver 903 and may overall control the device to receive an edge computing service according to the scheme described above in connection with the embodiments of FIGS. 1 to 8 using the program (application client (EEC)) installed/stored in the UE.

For example, in a communication system supporting an edge computing service using an EDN including a first server (EES) providing first configuration information for transmission/reception of application data traffic to/from the UE and a second server (EAS) transmitting/receiving application data traffic to/from the UE, the UE may include a transceiver 903 and a processor 901 configured to transmit a service provisioning request to a third server (ECS) providing second configuration information for connection with the first server (EES) via the transceiver and receive a service provisioning response including network identification information (e.g., DNAI list information for the first server (EES) or the second server (EAS) capable of providing a service to the UE) related to the first server (EES) or the second server (EAS) from the third server (ECS) via the transceiver 903 in response to the service provisioning request.

Figure 10:
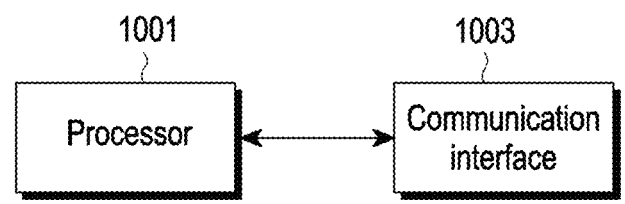
FIG. 10 is a view illustrating a configuration of a server according to an embodiment of the disclosure.

FIG. 10 is a view illustrating a configuration of a server according to an embodiment of the disclosure. The server of FIG. 10 may include a processor 1001 and a communication interface 1003 that may perform wired/wireless communication according to a predetermined communication scheme in a communication system supporting the above-described edge computing service. The processor 1001 may control the operation of the communication interface 1003 and may overall control the device to receive an edge computing service according to the scheme described above in connection with the embodiments of FIGS. 1 to 8 using the program (EAS, EES, or ECS) installed/stored in the server. The server of FIG. 10 may be at least one of an EAS, EES, and ECS.

For example, in a communication system supporting an edge computing service using an EDN including a first server (EES) providing first configuration information for transmitting/receiving application data traffic to/from the UE and a second server (EAS) transmitting/receiving application data traffic to/from the UE, a third server (ECS) providing the UE with second configuration information for connection with the first server (EES) may include a communication interface 1003 and a processor 1001 configured to receive a service provisioning request from the UE via the communication interface 1003 and transmit a service provisioning response including network identification information related to the second server or the third server to the UE via the communication interface 1003 in response to the service provisioning request.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a user equipment (UE) including an edge enabler client (EEC) in a communication system supporting an edge computing service using an edge data network including an edge enabler server (EES) and an edge application server (EAS) exchanging, with the UE, application data traffic, the method comprising:
    transmitting, by the EEC, a service provisioning request to an edge configuration server (ECS) providing configuration information for a connection with the EES; and
    receiving, by the EEC from the ECS, a service provisioning response including information of one or more data network access identifiers (DNAIs) associated with the EES in response to transmitting the service provisioning request,
    wherein the information of the one or more DNAIs is mapped to the EES accessible via a user plane function (UPF) to which the UE is connected.

2. The method of claim 1, wherein the information of the one or more DNAIs is included in EES list information.

3. The method of claim 1, wherein the edge data network includes one or more EESs and one or more EASs.

4. The method of claim 1, wherein receiving the service provisioning response further comprises:
    receiving the information of the one or more DNAIs for the EES determined by the ECS, and selecting, based on the one or more DNAIs, the EES; and
    connecting, based on the one or more DNAIs, to the EES.

5. The method of claim 1, wherein the service provisioning response further includes one or more DNAIs associated with the EAS.

6. A user equipment (UE) including an edge enabler client (EEC) in a communication system supporting an edge computing service using an edge data network including an edge enabler server (EES) and a EAS exchanging, with the UE, application data traffic, the UE comprising:
    a transceiver; and
    a processor configured to:
        transmit, via the transceiver by the EEC, a service provisioning request to a ECS providing configuration information for a connection with the EES, and
        receive, by the EEC via the transceiver from the ECS, a service provisioning response including information of information of one or more data network access identifiers (DNAIs) associated with the EES in response to transmitting the service provisioning request,
    wherein the information of the one or more DNAIs is mapped to the EES accessible via a user plane function (UPF) to which the UE is connected.

7. The UE of claim 6, wherein the information of the one or more DNAIs is included in EES list information.

8. The UE of claim 6, wherein the edge data network includes one or more EESs and one or more EASs.

9. The UE of claim 6, wherein the processor is further configured to:
    receive the information of the one or more DNAIs for the EES determined by the ECS, and
    selecting, based on the one or more DNAIs, the EES; and
    connect, based on the one or more DNAIs, to the EES.

10. The UE of claim 6, wherein the service provisioning response further includes one or more DNAIs associated with the EAS.

11. A method of an edge configuration server (ECS) providing configuration information for a connection with an edge enabler server (EES) in a communication system supporting an edge computing service using an edge data network including the EES and an edge application server (EAS) exchanging, with a user equipment (UE) including an edge enabler client (EEC), application data traffic, the method comprising:
    receiving a registration request including one or more data network access identifiers (DNAIs) associated with the EES from the EES over the edge data network;
    transmitting a registration response including a registration result to the EES;
    receiving a service provisioning request from the EEC of the UE; and
    transmitting, to the EEC of the UE, a service provisioning response including information of the one or more DNAIs associated with the EES in response to receiving the service provisioning request,
    wherein the information of the one or more DNAIs is mapped to the EES accessible via a user plane function (UPF) to which the UE is connected.

12. The method of claim 11, wherein the information of the one or more DNAIs is included in EES list information.

13. The method of claim 11, wherein the edge data network includes one or more EESs and one or more EASs.

14. The method of claim 11, wherein the one or more DNAIs are determined based on location information for the UE or DNAI information corresponding to a server accessible via the UPF being currently connected with the UE.

15. The method of claim 11, the service provisioning response further includes one or more DNAIs associated with the EAS.

16. An edge configuration server (ECS) providing second configuration information for a connection with an edge enabler server (EES) in a communication system supporting an edge computing service using an edge data network including the EES and an edge application server (EAS) exchanging, with a user equipment LUE) including an edge enabler client (EEC), application data traffic, the ECS comprising:
    a communication interface; and
    a processor configured to:
        receive a registration request including one or more data network access identifiers (DNAIs) associated with the EES from the EES over the edge data network,
        transmit a registration response including a registration result to the EES,
        receive a service provisioning request from the EEC of the UE via the communication interface, and
        transmit, to the EEC of the UE via the communication interface, a service provisioning response including information of the one or more DNAIs associated with the EES in response to receiving the service provisioning request, wherein the information of the one or more DNAIs is mapped to the EES accessible via a user plane function (UPF) to which the UE is connected.

17. The ECS of claim 16, wherein the information of the one or more DNAIs is included in EES list information.

18. The ECS of claim 16, wherein the edge data network includes one or more EESs and one or more EASs.

19. The ECS of claim 16, wherein the one or more DNAIs are determined based on location information for the UE or DNAI information corresponding to a server accessible via a user plane function (UPF) being currently connected with the UE.

20. The ECS of claim 16, the service provisioning response further includes one or more DNAIs associated with the EAS.

* * * * *